United States Patent
Lau et al.

(10) Patent No.: US 6,716,915 B2
(45) Date of Patent: Apr. 6, 2004

(54) METHOD OF FORMING TOUGHENED THERMOSET ARTICLES AND TOUGHENED THERMOSET ARTICLES PRODUCED THEREBY

(75) Inventors: Willie Lau, Ambler, PA (US); Paul Ralph Van Rheenen, Warminster, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/951,640

(22) Filed: Sep. 13, 2001

(65) Prior Publication Data

US 2002/0058753 A1 May 16, 2002

Related U.S. Application Data

(63) Continuation-in-part of application No. 60/232,414, filed on Sep. 14, 2000.

(51) Int. Cl.[7] .......................... C08L 51/00; C08L 63/00; C08L 67/00
(52) U.S. Cl. .............................. 525/63; 525/64; 525/65; 525/66; 525/68; 525/69; 525/70
(58) Field of Search .............................. 525/63, 64, 65, 525/66, 68, 69, 70

(56) References Cited

U.S. PATENT DOCUMENTS

| | | | |
|---|---|---|---|
| 5,028,677 A | 7/1991 | Janowicz | 526/329 |
| 5,064,900 A | 11/1991 | Iwai et al. | |
| 5,225,491 A | * 7/1993 | Yu | |
| 5,247,040 A | 9/1993 | Amick et al. | 526/286 |
| 5,264,530 A | 11/1993 | Darmon et al. | 526/194 |
| 5,506,320 A | 4/1996 | Yu | 526/266 |
| 5,521,266 A | 5/1996 | Lau | 526/200 |
| 5,602,220 A | 2/1997 | Haddleton et al. | 526/172 |
| 5,756,605 A | 5/1998 | Moad et al. | 526/93 |
| 5,804,632 A | 9/1998 | Haddleton et al. | 524/458 |

FOREIGN PATENT DOCUMENTS

| | | | |
|---|---|---|---|
| JP | 63-375 | * | 1/1988 |
| WO | WO99/03905 | | 1/1999 |

OTHER PUBLICATIONS

Takahashi, CAPLUS AN 1988:424009.*
Applications of Anionic Polymerization Research, R. P. Quirk Ed, ACS Symp. Ser. 696, 208(1998); "Practical Applications of Macromonomer Techniques for the Synthesis of Comb–Shaped Copolymers", Authors S. Roos, A.H. E. Muller, M. Kaufmann, W. Siol, C. Auschra.
Journal of Polymer Science Part A: Polymer Chemistry, vol. 34, 3173 3181; "Compatibilization of the PBA/PMMA Core/Shell Latex Interphase, I. Partitioning of PMMA Macromonomer in the PBA Seed Latex", Authors, V. Nelliappan, M. S. El–aaser, A. Klein, E. S. Daniels, and J. E. Roberts.
J. Macromol Sci.—Chem. A27(4) pp. 491–507 (1990), "Copolymerization of Polymethyl Methacrylate Macromers with n–Butyl Acrylate and Mechanical Properties Of the Graft Copolymers", Authors Hong–Quan Xie and Shi–Biao Zhou.

* cited by examiner

*Primary Examiner*—Jeffrey Mullis
(74) *Attorney, Agent, or Firm*—Richard R. Clikeman

(57) ABSTRACT

A method of forming a toughened article from a blend of a thermosetting polymer and a comb copolymer is disclosed, along with the toughened thermoset article produced thereby. Compositions including a thermosetting polymer and a comb copolymer are also disclosed.

17 Claims, No Drawings

METHOD OF FORMING TOUGHENED THERMOSET ARTICLES AND TOUGHENED THERMOSET ARTICLES PRODUCED THEREBY

This application is a continuation-in-part of Ser. No. 60/232,414, filed Sep. 14, 2000.

The present invention relates to a method of toughening thermoset polymers through incorporation of comb copolymers.

It is well known in the art that articles formed by shaping and curing thermosetting polymers are often brittle. Cured thermoset polymers may, however, be toughened through incorporation of toughening agents commonly known in the art as impact modifiers. An impact modifier may, typically, be mixed with a thermosetting polymer to form a thermosetting blend. The thermosetting blend may then be caused (e.g., in a mold) to take the shape desired for the article, followed by curing to produce a thermoset article.

Typically, an impact modifier is a particulate polymer having one or more phases, wherein at least one of those polymeric phases is characterized by a glass transition temperature, Tg, below the envisioned use temperature of the article into which it is to be incorporated. Although not wishing to be bound by theory, it is thought that the dispersed low Tg impact modifier phase serves to distribute and dissipate the energy associated with a narrowly focused impact event.

Core-shell impact modifiers are used commercially to toughen thermoset polymers. These core-shell polymers exist as particles having a diameter (i.e., particle size) of characteristically from 0.1 to one micron. The core is made of a low Tg polymer (e.g., less than 0° C.) which is crosslinked. The core polymer is further not miscible with the thermoset polymer due to its composition and its state of crosslinking. As a result, it is necessary to provide the core with a shell made of a polymer that is miscible with the thermoset polymer. During processing, the miscible shell polymer, which may be grafted to the core polymer to some extent, interacts with the thermoset polymer to speed the break up of the larger powder particles (typically a few hundred microns in diameter) into much smaller core-shell particles (0.1–1 micron), and to enhance dispersion of the individual core-shell particles into the thermoset melt. In this way, thermoset articles are made that contain uniformly distributed core-shell particles, and hence rubbery core domains, throughout. While these core-shell polymers perform as impact modifiers for many thermosets, they are limited in that their crosslinked cores have only a single size and not all of the compatibilizing chains of shell polymer are attached to the core network. Thus, the shell polymer never fully realizes its potential to compatibilize the core polymer.

U.S. Pat. No. 5,506,320 discloses a reactive polymeric modifier for improving the toughness and/or flexibility of thermosetting resins where the polymeric modifier has a comb configuration including a saturated polymeric backbone having reactive groups at each end and at least one pendent chain which is miscible with the thermosetting resin prior to curing. It is a requirement of the disclosure the terminal groups be present, and that they be reactive with the thermosetting resin. The reactive terminal groups of the backbone are carboxy, hydroxy, amino, vinyl, or thio groups. For each thermosetting polymer, the terminal groups of the polymeric modifier are chosen to be reactive with functional groups of that particular thermosetting polymer. The disclosed comb copolymer has a number average molecular weight of 1,000 to 20,000, and its backbone is a polymeric chain of carbon-carbon linkages free of olefinic unsaturation, having a glass transition temperature in the range of −100° C. to 25° C. Unfortunately, the disclosure of U.S. Pat. No. 5,506,320 is limited in that any toughening of the thermoset article being produced is confined to that which may be produced by crosslinking of the very low molecular weight comb copolymer with the thermosetting polymer.

We have, surprisingly, found that thermosetting blends which include thermosetting polymers and comb copolymers can be shaped and cured to form thermoset articles that are toughened when compared with similar articles prepared from the corresponding thermosetting polymers absent comb copolymer. These comb copolymers have a number average molecular weight greater than 25,000 and a corresponding weight average molecular weight of greater than 75,000, and their ability to toughen thermoset polymers does not require that the comb copolymers bear reactive functionality. Furthermore, the backbone portions of the comb copolymers are immiscible in the thermosetting polymer, and hence form rubbery domains within the cured, thermoset article, providing enhanced toughening.

One aspect of the present invention relates to a method comprising the steps of:

(a) forming a thermosetting blend comprising a thermosetting polymer and a comb copolymer;

(b) shaping said thermosetting blend; and (c) curing said thermosetting blend to form an article;

wherein said comb copolymer comprises a backbone and at least one graft segment;

wherein said forming comprises mixing and, optionally, heating; and wherein said article has a fracture toughness at least 15 percent greater than that of a second article formed identically, absent the comb copolymer.

A second aspect of the present invention relates to an article comprising a thermoset polymer and a comb copolymer, wherein said article has a fracture toughness at least 15 percent greater than that of a second article formed identically, absent said comb copolymer.

A third aspect of the present invention relates to an article produced by the method of the first aspect of the present invention.

The thermosetting polymer of the present invention is a polymer selected from the group consisting of: acrylate polymer; polyester polymer; polyurethane polymer, epoxy polymer, vinyl ester polymer; unsaturated polyester; phenol-formaldehyde formaldehyde polymer, melamine-formaldehyde polymer, urea-formaldehyde polymer, and combinations thereof.

Used herein, the following terms have these definitions:

A "thermosetting polymer" is a resin that typically is of low enough molecular weight that it is a pourable liquid, yet has the capability of being transformed into a high molecular weight, often crosslinked, polymer that is no longer a liquid, nor even a melt processable thermoplastic polymer. The cured polymer is permanently set, and cannot be converted to a fluid melt by heating and mixing. The curing, or setting, of a thermosetting polymer may be accomplished by heating. This heating may serve to activate thermally labile functional groups attached to the thermosetting polymer, if such groups are present. Alternatively, heating may be done in the presence of catalysts, initiators, or combinations thereof. These initiators and catalysts may be thermally activated, photochemically activated, or both. When photochemical activation, e.g., exposure to ultra-violet light, is used, a photosensitizing material may be added. The curing process may further be accomplished through the reaction of functional groups on the polymeric chain of the thermosetting polymer with reactive functional groups on another polymer or other additive with which it may be combined. Further, multiple curing methods may be combined, and there may be a post-cure step as well, to assure that full curing has occurred. In some cases, heating may not be required to adequately cure the thermosetting polymer, or a portion of the curing may occur at room temperature, followed by a "post-cure" at an elevated temperature.

A "thermosetting composition" is a composition that includes a thermosetting polymer.

A "thermosetting blend" is a blend that includes a thermosetting polymer and at least one other component. A "thermosetting blend" is a type of a "thermosetting composition". The "thermosetting blend" of the present invention is a blend including a thermosetting polymer and a "comb copolymer". The thermosetting blend is, preferably a liquid at room temperature. However, heating may be required to make the thermosetting blend fluid enough so that it can be shaped into the shape of the desired article before or during curing, preferably before curing.

A "thermoset polymer" is a polymer prepared by the curing, or setting, of a thermosetting polymer. A "thermoset article" is an article produced by curing a "thermosetting polymer".

The "backbone" of a polymer chain is a collection of polymerized monomer units attached to one another. The attachment is typically achieved by covalent bonding. "Non-terminal" monomer units are directly attached to at least two other monomer units. A "terminal" monomer unit resides at the end of the polymer chain and is directly attached to one other monomer unit. For example, the polymerized monomer units of the backbone may be derived from ethylenically unsaturated monomers. It is required that the composition of the backbone of the comb copolymer of the present invention will be such that the backbone is not miscible in the thermosetting polymer of the invention. The solubility parameters of the backbone and the thermosetting polymer can be estimated and compared to predict miscibility by methods such as that of Van Krevelen, described herein below.

A "linear" polymer (homopolymer or copolymer) is a polymer having a backbone that is not branched. As used herein, the term "linear" is also meant to include polymers wherein a minor amount of branching has occurred. For example, hydrogen abstraction may lead to branching during free radical polymerizations.

A "branched" polymer is a polymer having a first "backbone segment" that has other backbone segments (i.e., "branches") chemically attached to it through a "non-terminal" atom of the first backbone segment. Typically, this first backbone segment and all of the branches have the same, or similar, composition.

A "pendant" group is a group that is attached to the backbone of a polymer. The term pendant may be used to describe a group that is actually part of a polymerized monomer unit. For example, the hydroxyethyl group of a polymerized unit of 2-hydroxyethyl methacrylate may be referred to as a "pendant hydroxyethyl group", or as "pendant hydroxy functionality". It is also common to refer to large groups attached to a polymer backbone as "pendant" when those large groups are compositionally distinct from the backbone polymer. These large groups may themselves be polymer chains. For example, when a macromonomer becomes incorporated into a polymer chain by reaction with other monomers, the two carbons of its reactive double bond become part of the backbone, while the polymeric chain originally attached to the double bond of the macromonomer becomes a "pendant group" that may, for example, have a molecular weight of 500 to 100,000. A "pendant" group may further be described as "pendant to" the backbone.

A "terminal" group resides at the end of the polymer chain and is chemically attached to a terminal monomer unit. A terminal group may, for example, have a composition distinct from the composition of the backbone of the polymer. A "pendant" group may occur in a "terminal" position. As such, a "terminal" group is a special case of a "pendant" group.

A "macromonomer" is any low molecular weight water-insoluble polymer or copolymer having at least one terminal ethylenically unsaturated group that is capable of being polymerized in a free radical polymerization process. By "water-insoluble" it is meant having a water solubility of no greater than 150 millimoles/liter at 25° C. to 50° C. By "low molecular weight" it is meant that the macromonomer has a degree of polymerization preferably from 10 to 1,000, more preferably from about 20 to about 1,000, and most preferably 20 to 200. By "degree of polymerization" it is meant the number of polymerized monomer units present in the macromonomer. See e.g., Kawakami in the "Encyclopedia of Polymer Science and Engineering", Vol. 9, pp. 195–204, John Wiley & Sons, New York, 1987. Typically, the macromonomer polymer chain contains ethylenically unsaturated monomers, as polymerized units. Preferably, the ethylenically unsaturated monomer is selected to impart low or no water solubility to the macromonomer as previously described herein.

The term "macromonomer aqueous emulsion" is an aqueous emulsion containing macromonomer dispersed therein as water insoluble particles.

A "graft segment" is a polymer chain occupying a pendant position along the polymer backbone. A graft segment may include, as polymerized units, one type of monomer or more than one type of monomer. The composition of a graft segment is different from the composition of the backbone polymer to which it is attached, in contrast to a "branch segment" of a branched backbone which has a composition which is the same as, or similar to, other portions the branched backbone of which it is a part. A "terminal graft segment" resides at an end of a backbone polymer chain and is chemically attached to that backbone polymer chain. A "terminal graft segment" is a special case of a "pendant graft segment". It is understood that, when it is indicated that a "graft segment" is present in a comb copolymer, more than one type of graft segment may be present.

"Graft copolymers" are macromolecules formed when polymer or copolymer chains are chemically attached as side chains to a polymeric backbone. Those side chains are the "graft segments" described herein above. Because graft copolymers often chemically combine unlike polymeric segments in one macromolecule, these copolymers have unique properties compared to the corresponding random copolymer analogues. These properties include, for example, mechanical film properties resulting from thermodynamically driven microphase separation of the copolymer, and decreased melt viscosities resulting in part from the segmental structure of the graft copolymer, and from separation of a soft (i.e., low Tg) phase. With respect to the latter, reduced melt viscosities can advantageously improve processability of the polymer. See e.g., Hong-Quan Xie and Shi-Biao Zhou, J. Macromol. Sci.-Chem., A27(4), 491–507 (1990); Sebastian Roos, Axel H. E. Müller, Marita Kaufmann, Werner Siol and Clenens Auschra, "Applications of Anionic Polymerization Research", R. P. Quirk, Ed., ACS Symp. Ser. 696, 208 (1998).

"Comb copolymer," of the present invention is the "graft copolymer" of the present invention. The terms are used interchangeably herein. The backbone of the comb copolymer is linear, or essentially linear, and each side chain (graft segment) of the graft copolymer is formed by a "macromonomer" that is grafted to the polymer backbone. The comb copolymers may, for example, be prepared by the free radical copolymerization of macromonomer with conventional monomer (e.g., second ethylenically unsaturated monomer). Either the graft segment or the backbone, or both of the comb copolymer may, optionally, bear functional groups reactive with the thermosetting polymer. These groups may include carboxyl, hydroxyl, epoxy, amino, vinyl, and thio, as well as salts of carboxyl. The terms "comb copolymer" and graft copolymer are used interchangeably herein. It is understood that when it is indicated that a "comb copolymer" is present in, for example, a thermosetting blend or thermoset article, more than one type of comb copolymer may be present.

A "comb copolymer segment" is a segment selected from the group consisting of the "backbone" of a comb copolymer and the "graft segment" of a comb copolymer. It is preferred that graft segment of the comb copolymer of the present invention is miscible with the thermosetting polymer of the present invention. It is further required that the backbone of the comb copolymer of the present invention not be miscible in the thermosetting polymer. The solubility parameters of a given copolymer segment and the thermosetting polymer can be estimated and compared to predict miscibility by methods such as that of Van Krevelen described herein below.

An "aqueous dispersion of a comb copolymer" is an aqueous medium in which are dispersed a plurality of particles of comb copolymer. Used herein, an "aqueous dispersion of a comb copolymer" is an "aqueous copolymer composition".

"Tg" is the "glass transition temperature" of a polymeric phase. The glass transition temperature of a polymer is the temperature at which a polymer transitions from a rigid, glassy state at temperatures below Tg to a fluid or rubbery state at temperatures above Tg. The Tg of a polymer is typically measured by differential scanning calorimetry (DSC) using the mid-point in the heat flow versus temperature transition as the Tg value. A typical heating rate for the DSC measurement is 20 Centigrade degrees per minute. The Tg of various homopolymers may be found, for example, in *Polymer Handbook,* edited by J. Brandrup and E. H. Immergut, Interscience Publishers. The Tg of a polymer is estimated by using the Fox equation (T. G. Fox, Bull. *Am. Physics Soc.,* Volume 1, Issue No. 3, page 123 (1956)).

"Effective Tg". When a substance having some degree of solubility in a polymer is imbibed by that polymer, the softening temperature of the polymer decreases. This plasticization of the polymer can be characterized by measuring the "effective Tg" of the polymer, which typically bears an inverse relationship to the amount of solvent or other substance contained in the polymer. The "effective Tg" of a polymer containing a known amount of a substance dissolved within is measured just as described above for "Tg". Alternatively, the "effective Tg" may be estimated by using the Fox equation (supra), assuming a value for Tg (e.g., the freezing point) of the solvent or other substance contained in the polymer.

Molecular Weight. Synthetic polymers are almost always a mixture of chains varying in molecular weight, i.e., there is a "molecular weight distribution", abbreviated "MWD". For a homopolymer, members of the distribution differ in the number of monomer units which they contain. This way of describing a distribution of polymer chains also extends to copolymers. Given that there is a distribution of molecular weights, the most complete characterization of the molecular weight of a given sample is the determination of the entire molecular weight distribution. This characterization is obtained by separating the members of the distribution and then quantitating the amount of each that is present. Once this distribution is in hand, there are several summary statistics, or moments, which can be generated from it to characterize the molecular weight of the polymer.

The two most common moments of the distribution are the "weight average molecular weight", "$M_w$", and the "number average molecular weight", "$M_n$". These are defined as follows:

$$M_w = \Sigma(W_i M_i)/\Sigma W_i = \Sigma(N_i M_i^2)/\Sigma N_i M_i$$

$$M_n = \Sigma W_i/\Sigma(W_i/M_i) = \Sigma(N_i M_i)/\Sigma N_i$$

where:

$M_i$=molar mass of $i^{th}$ component of distribution $W_i$=weight of $i^{th}$ component of distribution $N_i$=number of chains of $i^{th}$ component and the summations are over all the components in the distribution. $M_w$ and $M_n$ are typically computed from the MWD as measured by Gel Permeation Chromatography (see the Experimental Section).

"Particle size" is the diameter of a particle.

The "average particle size" determined for a collection of particles (e.g., macromonomer particles, or particles of graft copolymer) the "weight average particle size", "$d_w$", as measured by Capillary Hydrodynamic Fractionation technique using a Matec CHDF 2000 particle size analyzer equipped with a HPLC type Ultra-violet detector.

The term "particle size distribution" and the acronym "PSD" are used interchangeably. "Polydispersity" is used in the art as a measure of the breadth of the PSD. Used herein, "polydispersity" is a description of the distribution of particle sizes for a plurality of particles. As such, "polydispersity" and "PSD polydispersity" are used interchangeably. PSD polydispersity is calculated from the weight average particle size, $d_w$, and the number average particle size, $d_n$, according to the formulae:

$$\text{PSD Polydispersity} = (d_w)/(d_n),$$

where $d_n = \Sigma n_i d_i / \Sigma n_i$ $d_w = \Sigma n_i d_i d_i / \Sigma n_i d_i$, and where $n_i$ is the number of particles having the particle size $d_i$.

Estimation of whether a polymer and another component (i.e., another polymer of a solvent) will be miscible may be made according to the well-known methods delineated in D. W. Van Krevelen, *Properties of Polymers,* $3^{rd}$ Edition, Elsevier, pp. 189–225, 1990. For example, Van Krevelen defines the total solubility parameter ($\delta_t$) for a substance by:

$$\delta_t^2 = \delta_d^2 + \delta_p^2 + \delta_h^2,$$

where $\delta_d$, $\delta_p$, and $\delta_h$ are the dispersive, polar, and hydrogen bonding components of the solubility parameter, respectively. Values for $\delta_d$, $\delta_p$, and $\delta_h$ have been determined for many solvents, polymers, and polymer segments, and can be estimated using the group contribution methods of Van Krevelen. For example, to estimate whether a polymer having a given composition will be miscible with a particular solvent, one calculates $\delta_t^2$ for the polymer and $\delta_t^2$ for the solvent. Typically, if the difference between the two, $\Delta\delta_t^2$, is greater than 25 (i.e., $\Delta\delta_t$>5), then the polymer and the solvent will not be miscible.

If, instead, it is desired to determine whether two polymers, differing in composition, will be miscible, the same calculations may be carried out, but the predicted upper limit of $\Delta\delta_t^2$ for miscibility will decrease as the molecular weight of one or both of polymers under consideration increases. This decrease is thought to parallel the decrease in entropy of mixing which occurs as the molecular weight of the components being mixed increases. For example, two polymers, each having a degree of polymerization of 100, will likely be immiscible even if the value of $\Delta\delta_t^2$ for their mixture is 9, or even 4 (i.e., $\Delta\delta_t$=3, or even 2). Still higher molecular weight polymers may be immiscible at even lower values of $\Delta\delta_t$. To estimate whether a graft segment of the copolymer of the present invention, having a given composition, will be miscible with a backbone having another composition, one calculates $\delta_t^2$ for the graft segment and $\delta_t^2$ for the backbone. Typically, if the difference between the two, $\Delta\delta_t^2$, is greater than 9 (i.e., $\Delta\delta_t$>3), then the graft segment should be insoluble in the backbone polymer such that a film formed by the graft copolymer would have two distinct types of polymeric phase. Similar calculation can be performed to determine whether a film formed from a block copolymer will have more than one polymeric phase. Because it is desirable that the graft segment not be miscible with the backbone, the Van Krevelen calculations of miscibility provide useful estimates of whether a given pair of compositions of the graft segment and backbone will result in phase separation in, for example, films formed from the segmental copolymer. Similar calculation can be performed to determine whether a graft segment of a particular composition will be miscible with a thermosetting polymer of a given composition. Similar calculation can also be performed to determine whether a backbone of a particular composition will be immiscible with a thermosetting polymer of a given composition. Because it is desirable that the graft segment be miscible with the thermosetting polymer and that the backbone be immiscible with the same thermosetting polymer, the Van Krevelen calculations of miscibility, and other similar calculation methods, provide useful estimates of whether a given pair of compositions of the graft segment and backbone will result in compatibilization of immiscible, rubbery backbone of the comb copolymer with the thermosetting polymer to give the desired uniform distribution of those rubbery domains throughout the thermoset article after curing.

"Fracture toughness", designated "$K_{1c}$" expressed in units of $(MPa)m^{1/2}$ is the fracture toughness defined by ASTM Test Method E-399. Used herein, a thermoset article is considered to be "toughened" at a given level of comb copolymer if the fracture toughness for specimens, prepared and tested according to ASTM Test Method E-399 and having compositions identical to that of the article, is at least 15% greater than the fracture toughness of specimens identical in every way except that the comb copolymer is absent. For example, if ASTM E-399 specimens, prepared from a blend of a thermosetting polymer and a comb copolymer of the present invention, have an average fracture toughness of 1.15 $(MPa)m^{1/2}$, while specimens that are identical except that the comb copolymer is absent have a fracture toughness of 1.00 $(MPa)m^{1/2}$, then the increase in fracture toughness is 15%. This increase is calculated as follows:

% increase in $K_{1c}$=[(($K_{1c}$ with comb)/($K_{1c}$ without comb))−1]× 100%.

Used herein, an article having a composition identical to the composition of specimens prepared and tested using ASTM Test Method E-399 will be referred to as having a value for fracture toughness equal to the value for fracture toughness determined for those specimens. This definition applies to both: a toughened article that includes both a thermoset polymer (i.e., prepared by curing of a thermosetting polymer) and a comb copolymer; and a second article, identical in every way except that the comb copolymer is absent.

A preferred method of preparing the graft copolymers of the present invention and their aqueous dispersions is by emulsion polymerization. A preferred process for this preparation includes (a) forming, by polymerization of at least one first ethylenically unsaturated monomer, a macromonomer aqueous emulsion containing one or more water-insoluble particles of macromonomer; (b) forming a monomer composition containing at least one second ethylenically unsaturated monomer; and (c) combining at least a portion of the macromonomer aqueous emulsion and at least a portion of the monomer composition to form a "polymerization reaction mixture". The macromonomer and second ethylenically unsaturated monomer are polymerized in the presence of an initiator to form graft copolymer particles. The graft copolymers prepared by this preferred process are comb copolymers.

The macromonomer, present in the macromonomer aqueous emulsion as water insoluble particles, is any low molecular weight water-insoluble polymer or copolymer having at least one terminal ethylenically unsaturated group that is capable of being polymerized in a free radical polymerization process. By "water-insoluble" it is meant having a water solubility of no greater than 150 millimoles/liter at 25° C. to 50° C. By "low molecular weight" it is meant that the macromonomer has a degree of polymerization of preferably from 10 to 1,000, more preferably from 20 to 1,000, and most preferably from 20 to 200. By "degree of polymerization" it is meant the number of polymerized monomer units present in the macromonomer.

The macromonomer contains, as polymerized units, at least one first ethylenically unsaturated monomer. Preferably, the first ethylenically unsaturated monomer is selected to impart low or no water solubility to the macromonomer as previously described herein.

It is preferred that the composition of the macromonomer be chosen such that the graft segments of the comb copolymer formed therefrom will be miscible in the thermosetting polymer of the invention. The solubility parameters of the macromonomer (and graft segment prepared therefrom) and the thermosetting polymer can be estimated and compared to predict miscibility by methods such as that of Van Krevelen, described herein above.

The composition of the macromonomer should be chosen so that the Tg of the graft segment of the comb copolymer formed therefrom will be preferably from 50° C. to 180° C., more preferably from 50° C. to 130° C., and most preferably from 70° C. to 110° C.

Suitable first ethylenically unsaturated monomers for use in preparing macromonomer include for example methacrylate esters, such as $C_1$ to $C_{18}$ normal, branched, or cyclic alkyl esters of methacrylic acid, including methyl methacrylate, ethyl methacrylate, n-butyl methacrylate, cyclohexyl methacrylate, lauryl methacrylate, stearyl methacrylate; acrylate esters, such as $C_1$ to $C_{18}$ normal, branched, or cyclic alkyl esters of acrylic acid, including methyl acrylate, ethyl acrylate, n-butyl acrylate and 2-ethylhexyl acrylate; styrene; substituted styrenes, such as methyl styrene, a-methyl styrene or t-butyl styrene; olefinically unsaturated nitriles, such as acrylonitrile or methacrylonitrile; olefinically unsaturated halides, such as vinyl chloride, vinylidene chloride or vinyl fluoride; vinyl esters of organic acids, such as vinyl acetate; N-vinyl compounds such as N-vinyl pyrrolidone; acrylamide; methacrylamide; substituted acrylamides; substituted methacrylamides; hydroxyalkylmethacrylates such as hydroxyethylmethacrylate; hydroxyalkylacrylates; basic substituted (meth)acrylates and (meth)acrylamides, such as amine-substituted methacrylates including dimethylaminoethyl methacrylate, tertiary-butylaminoethyl methacrylate and dimethylaminopropyl methacrylamide and the likes; dienes such as 1,3-butadiene and isoprene; vinyl ethers; or combinations thereof. The term "(meth)" as used herein means that the "meth" is optionally present. For example, "(meth)acrylate" means methacrylate or acrylate.

The first ethylenically unsaturated monomer can also be a functional monomer including for example monomers containing hydroxy, amido, aldehyde, ureido, polyether, glycidylalkyl, keto functional groups or combinations thereof. These functional monomers are generally present in the macromonomer at a level of from 0.1 weight percent to 15 weight percent and more preferably from 0.5 weight percent to 10 weight percent, and most preferably from 1.0 to 3 weight percent, based on the total weight of the graft copolymer. Used herein, all ranges are inclusive and combinable. Examples of functional monomers include ketofunctional monomers such as the acetoacetoxy esters of hydroxyalkyl acrylates and methacrylates (e.g., acetoacetoxyethyl methacrylate) and keto-containing amides (e.g., diacetone acrylamide); allyl alkyl methacrylates or acrylates; glycidylalkyl methacrylates or acrylates; or combinations thereof. Such functional monomers can provide crosslinking if desired.

The macromonomer typically also contains as polymerized units less than 10 weight percent, preferably less than 5 weight percent, more preferably less than 2 weight percent and most preferably less than 1 weight percent acid containing monomer, based on the total weight of the macromonomer. In a most preferred embodiment, the macromonomer contains no acid containing monomer. Used herein, "acid containing monomer" and "acid functional monomer" are used interchangeably. By "acid containing monomer" it is meant any ethylenically unsaturated monomer that contains one or more acid functional groups or functional groups that are capable of forming an acid (e.g., an anhydride such as methacrylic anhydride or tertiary butyl methacrylate). Examples of acid containing monomers include, for example, carboxylic acid bearing ethylenically unsaturated monomers such as acrylic acid, methacrylic acid, itaconic acid, maleic acid and fumaric acid; acryloxypropionic acid and (meth)acryloxypropionic acid; sulphonic acid-bearing monomers, such as styrene sulfonic acid, sodium vinyl sulfonate, sulfoethyl acrylate, sulfoethyl methacrylate, ethylmethacrylate-2-sulphonic acid, or 2-acrylamido-2-methylpropane sulphonic acid; phosphoethylmethacrylate; the corresponding salts of the acid containing monomer; or combinations thereof.

The macromonomer may also contains as polymerized units, mercapto-olefins. Used herein, "mercapto-olefin" and "mercaptan-olefin" are used interchangeably. These mercapto-olefin compounds are those as disclosed in U.S. Pat. No. 5,247,000 to Amick. Further, the methods of U.S. Pat. No. 5,247,000 may be utilized to prepare comb copolymers of the present invention.

In a preferred embodiment of the present invention, the macromonomer is composed of 20 weight percent to 100 weight percent, more preferably from 50 to 100 weight percent, and most preferably from 70 to 100 weight percent, based on total weight of macromonomer, of at least one α-methyl vinyl monomer, a non α-methyl vinyl monomer terminated with an α-methyl vinyl monomer, or combinations thereof. In a most preferred embodiment of the present invention the macromonomer contains as polymerized units from 90 to 100 weight percent α-methyl vinyl monomers, non α-methyl vinyl monomers terminated with α-methyl vinyl monomers, or combinations thereof, based on the total weight of the macromonomer. The phrase "non α-methyl vinyl monomer terminated with an α-methyl vinyl monomer" means that, when a vinyl monomer bearing no α-methyl group is present, as polymerized units, in the macromonomer, the macromonomer must be terminated by a unit derived from an α-methyl vinyl monomer. For example, while styrene might be present, as polymerized units, in a macromonomer chain, that macromonomer chain would be terminated by α-methyl styrene, or some other α-methyl vinyl monomer. Suitable α-methyl vinyl monomers include, for example, methacrylate esters, such as $C_1$ to $C_{18}$ normal, branched, or cyclic alkyl esters of methacrylic acid, including methyl methacrylate, ethyl methacrylate, butyl methacrylate, 2-ethylhexyl methacrylate, cyclohexyl methacrylate, isobornyl methacrylate, lauryl methacrylate, or stearyl methacrylate; hydroxyalkyl methacrylates such as hydroxyethyl methacrylate; glycidylmethacrylate; phenyl methacrylate; methacrylamide; methacrylonitrile; or combinations thereof.

One skilled in the art will recognize that there are many ways to prepare the macromonomer useful in the present invention. For example, the macromonomer may be prepared by a high temperature (e.g., at least 150° C.) continuous process such as disclosed in U.S. Pat. No. 5,710,227 or EP-A-1,010,706, published Jun. 21, 2000. In a preferred continuous process, a reaction mixture of first ethylenically unsaturated monomers is passed through a heated zone having a temperature of at least 150° C., and more preferably at least 275° C. The heated zone may also be maintained at a pressure above atmospheric pressure (e.g., greater than 3,000 kPa=greater than 30 bar). The reaction mixture of monomers may also optionally contain a solvent such as water, acetone, methanol, isopropanol, propionic acid, acetic acid, dimethylformamide, dimethylsulfoxide, methylethylketone, or combinations thereof.

The macromonomer useful in the present invention may also be prepared by polymerizing first ethylenically unsaturated monomers in the presence of a free radical initiator and a catalytic metal chelate chain transfer agent (e.g., a transition metal chelate). Such a polymerization may be carried out by a solution, bulk, suspension, or emulsion polymerization process. Suitable methods for preparing the macromonomer using a catalytic metal chelate chain transfer agent are disclosed in for example U.S. Pat. Nos. 4,526,945, 4,680,354, 4,886,861, 5,028,677, 5,362,826, 5,721,330, and 5,756,605; European publications EP-A-0199,436, and EP-A-0196783; and PCT publications WO 87/03605, WO 96/15158, and WO 97/34934.

Preferably, the macromonomer useful in the present invention is prepared by an aqueous emulsion free radical polymerization process using a transition metal chelate complex. Preferably, the transition metal chelate complex is a cobalt (II) or (III) chelate complex such as, for example, dioxime complexes of cobalt (II), cobalt (II) porphyrin complexes, or cobalt (II) chelates of vicinal iminohydroxyimino compounds, dihydroxyimino compounds, diazadihydroxyiminodialkyldecadienes, or diazadihydroxyiminodialkylundecadienes, or combinations thereof. These complexes may optionally include bridging groups such as $BF_2$, and may also be optionally coordinated with ligands such as water, alcohols, ketones, and nitrogen bases such as pyridine. Additional suitable transition metal complexes are disclosed in for example U.S. Pat. Nos. 4,694,054; 5,770,665; 5,962,609; and 5,602,220. A preferred cobalt chelate complex useful in the present invention is Co II (2,3-dioxyiminobutane-$BF_2$)$_2$, the Co III analogue of the aforementioned compound, or combinations thereof. The spatial arrangements of such complexes are disclosed in for example EP-A-199436 and U.S. Pat. No. 5,756,605.

In preparing macromonomer by an aqueous emulsion polymerization process using a transition metal chelate chain transfer agent, at least one first ethylenically unsaturated monomer is polymerized in the presence of a free radical initiator and the transition metal chelate according to conventional aqueous emulsion polymerization techniques. Preferably, the first ethylenically unsaturated monomer is an α-methyl vinyl monomer as previously described herein.

The polymerization to form the macromonomer is preferably conducted at a temperature of from 20° C. to 150° C., and more preferably from 40° C. to 95° C. The solids level at the completion of the polymerization is typically from 5 weight percent to 70 weight percent, and more preferably from 30 weight percent to 60 weight percent, based on the total weight of the aqueous emulsion.

The concentration of initiator and transition metal chelate chain transfer agent used during the polymerization process is preferably chosen to obtain the desired degree of polymerization of the macromonomer. Preferably, the concentration of initiator is from 0.2 weight percent to 3 weight percent, and more preferably from 0.5 weight percent to 1.5 weight percent, based on the total weight of monomer. Preferably, the concentration of transition metal chelate chain transfer agent is from 5 ppm to 200 ppm, and more preferably from 10 ppm to 100 ppm, based on the total monomers used to form the macromonomer.

The first ethylenically unsaturated monomer, initiator, and transition metal chelate chain transfer agent may be added in any manner known to those skilled in the art to carry out the polymerization. For example, the monomer, initiator and transition metal chelate may all be present in the aqueous emulsion at the start of the polymerization process (i.e., a batch process). Alternatively, one or more of the components may be gradually fed to an aqueous solution (i.e., a continuous or semi-batch process). For example, it may be desired to gradually feed the entire or a portion of the initiator, monomer, and/or transition metal chelate to a solution containing water and surfactant. In a preferred embodiment, at least a portion of the monomer and transition metal chelate are gradually fed during the polymerization, with the remainder of the monomer and transition metal chelate being present in the aqueous emulsion at the start of the polymerization. In this embodiment, the monomer may be fed as is, or suspended or emulsified in an aqueous solution prior to being fed.

Any suitable free radical initiator may be used to prepare the macromonomer. The initiator is preferably selected based on such parameters as its solubility in one or more of the other components (e.g., monomers, water); half life at the desired polymerization temperature (preferably a half life within the range of from about 30 minutes to about 10 hours), and stability in the presence of the transition metal chelate. Suitable initiators include for example azo compounds such as 2,2'-azobis (isobutyronitrile), 4,4'-azobis(4-cyanovaleric acid), 2,2'-azobis [2-methyl-N-(1,1-bis (hydroxymethyl)-2-(hydroxyethyl)]-propionamide, and 2,2'-azobis [2-methyl-N-(2-hydroxyethyl)]-propionamide; peroxides such as t-butyl hydroperoxide, benzoyl peroxide; sodium, potassium, or ammonium persulphate or combinations thereof. Redox initiator systems may also be used, such as for example persulphate or peroxide in combination with a reducing agent such as sodium metabisulphite, sodium bisulfite, sodium formaldehyde sulfoxylate, isoascorbic acid, or combinations thereof. Metal promoters, such as iron, may also optionally be used in such redox initiator systems. Also, buffers, such as sodium bicarbonate may be used as part of the initiator system.

An emulsifier is also preferably present during the aqueous emulsion polymerization process to prepare the macromonomer. Any emulsifier may be used that is effective in emulsifying the monomers such as for example anionic, cationic, or nonionic emulsifiers. In a preferred embodiment, the emulsifier is anionic such as for example sodium, potassium, or ammonium salts of dialkylsulphosuccinates; sodium, potassium, or ammonium salts of sulphated oils; sodium, potassium, or ammonium salts of alkyl sulphonic acids, such as sodium dodecyl benzene sulfonate; sodium, potassium, or ammonium salts of alkyl sulphates, such as sodium lauryl sulfate; ethoxylated alkyl ether sulfates; alkali metal salts of sulphonic acids; C12 to C24 fatty alcohols, ethoxylated fatty acids or fatty amides; sodium, potassium, or ammonium salts of fatty acids, such as Na stearate and Na oleate; or combinations thereof The amount of emulsifier in the aqueous emulsion is preferably from 0.05 weight percent to 10 weight percent, and more preferably from 0.3 weight percent to 3 weight percent, based on the total weight of the monomers.

The macromonomer thus prepared is emulsion polymerized with at least one second ethylenically unsaturated monomer to form a copolymer composition containing graft copolymer particles. The polymerization is carried out by providing the macromonomer as water insoluble particles in a macromonomer aqueous emulsion and the second ethylenically unsaturated monomer in a monomer composition. At least a portion of the macromonomer aqueous emulsion is combined with at least a portion of the monomer composition to form a polymerization reaction mixture that is polymerized in the presence of an initiator.

Although in no way intending to be bound by theory, it is believed that by providing the macromonomer in the form of water insoluble macromonomer particles in an aqueous emulsion, and the second ethylenically unsaturated monomer in a separate monomer composition, upon combination, the second ethylenically unsaturated monomer diffuses through the aqueous phase and then into the macromonomer particles where the polymerization occurs. Preferably, the diffusion of the second ethylenically unsaturated monomer into the macromonomer particles is evidenced by swelling of the macromonomer particles. It is an essential feature of the invention that, prior to being combined with the monomer composition, the macromonomers are present in plural discrete particles dispersed in the aqueous phase. Preferably, these plural macromonomer particles have previously been formed by aqueous emulsion polymerization, and the resultant macromonomer aqueous emulsion is combined with the monomer composition and subsequently polymerized without being isolated. Addition of the monomer composition to the macromonomer aqueous emulsion results initially in the presence of plural monomer droplets in the aqueous emulsion as separate entities distributed among, but not in direct contact with, the plural macromonomer particles. That is, the monomer droplets are separated from the macromonomer particles, and from each other, by an aqueous phase. Individual monomer molecules must then exit the monomer droplet, dissolve in the aqueous phase, diffuse through that aqueous phase to a macromonomer particle, and enter that macromonomer particle where polymerization to form the graft copolymer (i.e., comb copolymer) occurs. Because the water insoluble macromonomers are unable to diffuse through the aqueous phase, it is essential that the monomer droplets not include water insoluble macromonomer if gel formation is to be avoided and if the number of particles initially established by the macromonomer particles is to be maintained during polymerization of monomers with macromonomers.

The macromonomer aqueous emulsion useful in the present invention may be formed in any manner known to those skilled in the art. For example, the macromonomer, produced by any known method, may be isolated as a solid (e.g., spray dried) and emulsified in water. Also, for example, the macromonomer, if prepared via an emulsion or aqueous based polymerization process, may be used as is, or diluted with water or concentrated to a desired solids level.

In a preferred embodiment of the present invention, the macromonomer aqueous emulsion is formed from the emulsion polymerization of at least one first ethylenically unsaturated monomer in the presence of a transition metal chelate chain transfer agent as described previously herein. This embodiment is preferred for numerous reasons. For example, the macromonomer polymerization can be readily controlled to produce a desired particle size distribution (preferably narrow, e.g., polydispersity less than 2). Also, for example, additional processing steps, such as isolating the macromonomer as a solid, can be avoided, leading to better process economics. In addition, the macromonomer, macromonomer aqueous emulsion, and the graft copolymer can be prepared by consecutive steps in a single reactor which is desirable in a commercial manufacturing facility because process parameters, such as manufacturing cost and particle size distribution, may be optimized.

The "macromonomer aqueous emulsion" useful in the present invention contains from 20 weight percent to 60 weight percent, and more preferably from 30 weight percent to 50 weight percent of at least one water insoluble macromonomer, based on the total weight of macromonomer aqueous emulsion. The macromonomer aqueous emulsion may also contain mixtures of macromonomer. Preferably, the macromonomer aqueous emulsion contains less than 5 weight percent and more preferably less than 1 weight percent of ethylenically unsaturated monomer, based on the total weight of macromonomer aqueous emulsion.

The water insoluble macromonomer particles have a particle size chosen such that, upon addition of monomers, particles of graft copolymer (i.e., comb copolymer) having a desired particle size will be formed. For example, the final graft copolymer particle size is directly proportional to the initial particle size of the macromonomer and the concentration of second ethylenically unsaturated monomer in the polymerization reaction mixture, assuming all the particles participate equally in the polymerization. Preferably, the macromonomer particles have a weight average particle size of from 50 nm to 500 nm, and more preferably from 80 nm to 200 nm as measured by Capillary Hydrodynamic Fractionation technique using a Matec CHDF 2000 particle size analyzer equipped with a HPLC type Ultra-violet detector.

The macromonomer aqueous emulsion may also include one or more emulsifying agents. The type and amount of emulsifying agent is preferably selected in a manner to produce the desired particle size. Suitable emulsifying agents include those previously disclosed for use in preparing the macromonomer by an emulsion polymerization process. Preferred emulsifying agents are anionic surfactants such as, for example, sodium lauryl sulfate, sodium dodecylbenzene sulfonate, sulfated and ethoxylated derivatives of nonylphenols and fatty alcohols. The total level of emulsifying agent, based on the total weight of macromonomer is preferably from 0.2 weight percent to 5 weight percent and more preferably from 0.5 weight percent to 2 weight percent.

The "monomer composition" useful in the present invention contains at least one kind of second ethylenically unsaturated monomer. The monomer composition may contain all (i.e., 100%) monomer, or contain monomer dissolved or dispersed in an organic solvent and/or water. Preferably, the level of monomer in the monomer composition is from 50 weight percent to 100 weight percent, more preferably from 60 to 90 weight percent, and most preferably from 70 to 80 weight percent, based on the total weight of the monomer composition. Examples of organic solvents that may be present in the monomer composition include $C_6$ to $C_{14}$ alkanes. The organic solvent in the monomer composition will be no more than 30 weight percent, and more preferably no more than 5 weight percent, based on the total weight of the monomer composition.

In addition to water and/or organic solvent, the monomer composition may also optionally contain monomers containing functional groups, such as, for example, monomers containing hydroxy, amido, aldehyde, ureido, polyether, glycidylalkyl, keto groups or combinations thereof. These other monomers are generally present in the monomer composition at a level of from 0.5 weight percent to 15 weight percent, and more preferably from 1 weight percent to 3 weight percent based on the total weight of the graft copolymer. Examples of functional monomers include keto-functional monomers such as the acetoacetoxy esters of hydroxyalkyl acrylates and methacrylates (e.g., acetoacetoxyethyl methacrylate) and keto-containing amides (e.g., diacetone acrylamide); allyl alkyl methacrylates or acrylates; glycidylalkyl methacrylates or acrylates; or combinations thereof Such functional monomer can provide crosslinking if desired.

In a preferred embodiment, the monomers in the monomer composition are pre-emulsified in water to form a "monomer aqueous emulsion". Preferably, the monomer aqueous emulsion contains monomer droplets having a droplet size from 1 micron to 100 microns, and more preferably from 5 micron to 50 microns. Any suitable emulsifying agent may be used, for example those previously described, to emulsify the monomer to the desired monomer droplet size. Preferably, the level of emulsifying agent, if present, will be from 0.2 weight percent to 2 weight percent based on the total weight of monomer in the monomer composition.

The second ethylenically unsaturated monomer of the monomer composition is preferably selected to provide the desired properties in the resulting comb copolymer composition. Preferably, the second ethylenically unsaturated monomers are chosen so that, when they have been polymerized to form the backbone of the comb copolymer, that backbone will preferably have a Tg of −80° C. to 0° C., more preferably −65° C. to −20° C., and most preferably −65° C. to −40° C., as estimated herein above. Suitable ethylenically unsaturated monomers include for example methacrylate esters, such as $C_1$ to $C_{18}$ normal, branched, or cyclic alkyl esters of methacrylic acid, including methyl methacrylate, ethyl methacrylate, n-butyl methacrylate, 2-ethylhexyl methacrylate, cyclohexyl methacrylate, lauryl methacrylate, stearyl methacrylate, isobornyl methacrylate; acrylate esters, such as $C_1$ to $C_{18}$ normal or branched alkyl esters of acrylic acid, including methyl acrylate, ethyl acrylate, n-butyl acrylate and 2-ethylhexyl acrylate; styrene; substituted styrenes, such as methyl styrene, a-methyl styrene or t-butyl styrene; olefinically unsaturated nitriles, such as acrylonitrile or methacrylonitrile; olefinically unsaturated halides, such as vinyl chloride, vinylidene chloride or vinyl fluoride; vinyl esters of organic acids, such as vinyl acetate; N-vinyl compounds such as N-vinyl pyrrolidone; acrylamide; methacrylamide; substituted acrylamides; substituted methacrylamides; hydroxyalkylmethacrylates such as hydroxyethylmethacrylate; hydroxyalkylacrylates; dienes such as 1,3-butadiene and isoprene; vinyl ethers; or combinations thereof. The ethylenically unsaturated monomer can also be an acid containing monomer or a functional monomer, such as those previously described herein. Preferably, the ethylenically unsaturated monomer of the monomer composition does not contain amino groups.

It is a requirement of the present invention that the composition of the monomers (i.e., the second ethylenically unsaturated monomers) of the monomer composition of the present invention be chosen such that the backbone of the comb copolymer formed therefrom will be not be miscible in the thermosetting polymer. The solubility parameters of the backbone and the thermosetting polymer can be estimated and compared to predict immiscibility by methods such as that of Van Krevelen, described herein above.

In a preferred embodiment, the monomer composition includes one or more ethylenically unsaturated monomers selected from $C_1$ to $C_{18}$ normal, branched, or cyclic alkyl esters of acrylic acid, including methyl acrylate, ethyl acrylate, n-butyl acrylate and 2-ethylhexyl acrylate; styrene; substituted styrenes, such as methyl styrene, α-methyl styrene or t-butyl styrene; butadiene or combinations thereof.

As previously mentioned, the macromonomer aqueous emulsion and monomer composition are combined to form a "polymerization reaction mixture", and polymerized in the presence of a free radical initiator to form an "aqueous copolymer composition", also referred to herein as an "aqueous dispersion of a comb copolymer". The term "polymerization reaction mixture," as used herein, refers to the resulting mixture formed when at least a portion of the macromonomer aqueous emulsion and at least a portion of the monomer composition are combined. The polymerization reaction mixture may also contain initiator or any other additive used during the polymerization. Thus, the polymerization reaction mixture is a mixture that changes in composition as the macromonomer and monomer (i.e., second ethylenically unsaturated monomer) of the monomer composition are reacted to form comb copolymer.

The macromonomer aqueous emulsion and monomer composition may be combined in various ways to carry out the polymerization. For example, the macromonomer aqueous emulsion and the monomer composition may be combined prior to the start of the polymerization reaction to form the polymerization reaction mixture. Alternatively, the monomer composition could be gradually fed into the macromonomer aqueous emulsion, or the macromonomer aqueous emulsion could be gradually fed into the monomer composition. It is also possible that only a portion of the macromonomer aqueous emulsion and/or monomer composition be combined prior to the start of the polymerization with the remaining monomer composition and/or macromonomer aqueous emulsion being fed during the polymerization.

The initiator can also be added in various ways. For example, the initiator may be added in "one shot" to the macromonomer aqueous emulsion, the monomer composition, or a mixture of the macromonomer aqueous emulsion and the monomer composition at the start of the polymerization. Alternatively, all or a portion of the initiator can be co-fed as a separate feed stream, as part of the macromonomer aqueous emulsion, as part of the monomer composition, or any combination of these methods.

The preferred method of combining the macromonomer aqueous emulsion, the monomer composition, and initiator will depend on such factors as the desired graft copolymer composition. For example, the distribution of the macromonomer as a graft along the backbone can be affected by the concentrations of both the macromonomer and the second ethylenically unsaturated monomers at the time of the polymerization. In this regard, a batch process will afford high concentration of both the macromonomer and the second ethylenically unsaturated monomers at the onset of the polymerization whereas a semi-continuous process will keep the second ethylenically unsaturated monomer concentration low during the polymerization. Thus, through the method by which the macromonomer aqueous emulsion and monomer composition are combined, it is possible to control, for example: the number of graft segments, derived from macromonomer, per polymer chain; the distribution of graft segments in each chain, and the length of the polymer backbone.

Initiators useful in polymerizing the macromonomer and second ethylenically unsaturated monomer include any suitable initiator for emulsion polymerizations known to those skilled in the art. The selection of the initiator will depend on such factors as the initiator's solubility in one or more of the reaction components (e.g. monomer, macromonomer, water); and half life at the desired polymerization temperature (preferably a half life within the range of from about 30 minutes to about 10 hours). Suitable initiators include those previously described herein in connection with forming the macromonomer, such as azo compounds such as 4,4'-azobis (4-cyanovaleric acid), peroxides such as t-butyl hydroperoxide; sodium, potassium, or ammonium persulfate; redox initiator systems such as, for example, persulphate or peroxide in combination with a reducing agent such as sodium metabisulfite, sodium bisulfite, sodium formaldehyde sulfoxylate, isoascorbic acid; or combinations thereof. Metal promoters, such as iron; and buffers, such as sodium bicarbonate, may also be used in combination with the initiator. Additionally, Controlled Free Radical Polymerization (CFRP) methods such as Atom Transfer Radical Polymerization; or Nitroxide Mediated Radical Polymerization may be used. Preferred initiators include azo compounds such as 4,4'-azobis(4-cyanovaleric acid).

The amount of initiator used will depend on such factors as the copolymer desired and the initiator selected. Preferably, from 0.1 weight percent to 1 weight percent initiator is used, based on the total weight of monomer and macromonomer.

The polymerization temperature will depend on the type of initiator chosen and desired polymerization rates. Preferably, however, the macromonomer and second ethylenically unsaturated monomer are polymerized at a temperature of from 0° C. to 150° C., and more preferably from 20° C. to 95° C.

The amount of macromonomer aqueous emulsion and monomer composition added to form the polymerization reaction mixture will depend on such factors as the concentrations of macromonomer and second ethylenically unsaturated monomer in the macromonomer aqueous emulsion and monomer composition, respectively, and the desired comb copolymer composition. Preferably, the macromonomer aqueous emulsion and monomer composition are added in amounts to provide a comb copolymer containing as polymerized units from 10 weight percent to 60 weight percent, more preferably from 15 weight percent to 50 weight percent, and most preferably from 20 weight percent to 40 weight percent macromonomer, and from 40 weight percent to 90 weight percent, more preferably from 50 weight percent to 85 weight percent and most preferably from 60 weight percent to 80 weight percent second ethylenically unsaturated monomer.

One skilled in the art will recognize that other components used in conventional emulsion polymerizations may optionally be used in the method of the present invention. For example, to reduce the molecular weight of the resulting graft copolymer, the polymerization may optionally be conducted in the presence of one or more chain transfer agents, such as n-dodecyl mercaptan, thiophenol; halogen compounds such as bromotrichloromethane; or combinations thereof. Also, additional initiator and/or catalyst may be added to the polymerization reaction mixture at the completion of the polymerization reaction to reduce any residual monomer, (e.g., chasing agents). Suitable initiators or catalysts include those initiators previously described herein. In addition, the chain transfer capacity of a macromonomer through addition-fragmentation can be utilized in part to reduce molecular weight through appropriate design of monomer compositions and polymerization conditions. See e.g., E. Rizzardo, et. al., Prog. Pacific Polym. Sci., 1991, 1, 77–88; G. Moad, et. al., WO 96/15157.

Preferably, the process of the present invention does not require neutralization of the monomer, or resulting aqueous graft copolymer composition. These components preferably remain in unneutralized form (e.g., no neutralization with a base if acid functional groups are present).

The resulting aqueous graft copolymer composition formed by polymerization of the macromonomer and the ethylenically unsaturated monomer in the monomer composition preferably has a solids level of from 30 weight percent to 70 weight percent and more preferably from 40 weight percent to 60 weight percent. The aqueous graft copolymer composition preferably contains graft copolymer particles that are water insoluble and have a particle size of from 60 nm to 500 nm, and more preferably from 80 nm to 350 nm.

The graft copolymer formed preferably has a backbone containing, as polymerized units, the second ethylenically unsaturated monomer from the monomer composition, and one or more macromonomer units, as polymerized units, wherein a terminal ethylenically unsaturated group of the macromonomer is incorporated into the backbone and the remainder of the macromonomer becomes a graft segment pendant to the backbone (i.e., a side chain) upon polymerization. Preferably, each side chain is a graft segment derived from the grafting of one macromonomer to the backbone. The degree of polymerization of the graft segment derived from the macromonomer is preferably from 10 to 1,000, more preferably from 20 to 1,000, and most preferably from 20 to 200, where the degree of polymerization is expressed as the number of polymerized units of ethylenically unsaturated monomer used to form the macromonomer. The weight average molecular weight of the graft copolymer (i.e., of the comb copolymer) is preferably in the range of from 75,000 to 2,000,000, and more preferably from 100,000 to 1,000,000. The number average molecular weight of a comb copolymer is typically less than the corresponding weight average molecular weight. The number average molecular weights of the comb copolymers of the present invention are at least 25,000, and typically range from 25,000 to 600,000. Molecular weights as used herein can be determined by size exclusion chromatography (SEC), also known as gel permeation chromatography (GPC).

The comb copolymer particles of the aqueous graft copolymer composition can be isolated, for example, by spray drying or coagulation.

In a preferred embodiment of the present invention, the polymerization is conducted in two stages. In the first stage, the macromonomer is formed in an aqueous emulsion polymerization process, and in the second stage the macromonomer is polymerized with the second ethylenically unsaturated monomer in an emulsion. For efficiency, preferably these two stages are conducted in a single vessel. For example, in the first stage, the macromonomer aqueous emulsion may be formed by polymerizing in an aqueous emulsion at least one first ethylenically unsaturated monomer to form water insoluble macromonomer particles. This first stage polymerization is preferably conducted using a transition metal chelate chain transfer agent as previously described herein. After forming the macromonomer aqueous emulsion, a second emulsion polymerization is preferably performed in the same vessel to polymerize the macromonomer with at least one second ethylenically unsaturated monomer. This second stage may be conducted for example by directly adding (e.g., all at once or by a gradual feed) the monomer composition and initiator to the macromonomer aqueous emulsion. One main advantage of this embodiment is that the macromonomer does not have to be isolated, and the second polymerization can take place simply by adding the monomer composition and initiator to the macromonomer aqueous emulsion. In this preferred embodiment, the particle size and particle size distribution of the plural water insoluble macromonomer particles may be precisely controlled, and later addition of more macromonomer aqueous emulsion would typically not be required, except when, for example, a second mode (particle size and/or composition) of graft copolymer is desired.

In another preferred embodiment of the present invention, the polymerization of the macromonomer and second ethylenically unsaturated monomer is at least partially performed in the presence of an acid containing monomer, acid containing macromonomer, or combinations thereof. The acid containing monomer or acid containing macromonomer may be added in any manner to the polymerization reaction mixture. Preferably, the acid containing monomer or acid containing macromonomer is present in the monomer composition. The acid containing monomer or acid containing macromonomer may also be added as a separate stream to the polymerization reaction mixture.

The amount of acid containing monomer or acid containing macromonomer added to the polymerization reaction mixture is typically from 0 to 10 weight percent, preferably from 0.2 weight percent to 10 weight percent, more preferably from 0.5 weight percent to 5 weight percent, and most preferably from 1 weight percent to 2 weight percent, based on the total weight of monomer and macromonomer added to the polymerization reaction mixture.

Acid containing monomers which may be used in this embodiment include ethylenically unsaturated monomers bearing acid functional or acid forming groups such as those previously described herein. The "acid containing macromonomer" useful in this embodiment is any low molecular weight polymer having at least one terminal ethylenically unsaturated group that is capable of being polymerized in a free radical polymerization process, and that is formed from at least one kind of acid containing monomer. Preferably, the amount of acid containing monomer present, as polymerized units, in the acid containing macromonomer is from 50 weight percent to 100 weight percent, more preferably from 90 weight percent to 100 weight percent, and most preferably from 95 weight percent to 100 weight percent.

The acid containing macromonomer may be prepared according to any technique known to those skilled in the art such as those previously described herein. In a preferred embodiment of the present invention, the acid containing macromonomer is prepared by a solution polymerization process using a free radical initiator and transition metal chelate complex. Such a process is disclosed in, for example, U.S. Pat. No. 5,721,330. Preferred acid containing monomers used to form the acid containing macromonomer are α-methyl vinyl monomers such as methacrylic acid.

In another preferred embodiment of the present invention, a "macromolecular organic compound" having a hydrophobic cavity is present in the polymerization medium used to form the macromonomer and/or aqueous copolymer composition. Preferably, the macromolecular organic compound is used when copolymerizing ethylenically unsaturated monomers with very low water solubility such as lauryl or stearyl acrylates and/or methacrylates. By "very low water solubility" it is meant a water solubility at 25° C. to 50° C. of no greater than 50 millimoles/liter. For example, the macromolecular organic compound may be added to the monomer composition, the macromonomer aqueous emulsion, or the polymerization reaction mixture used to form the aqueous copolymer composition. Also, for example, the macromolecular organic compound may be added to an aqueous emulsion of ethylenically unsaturated monomer used to form the macromonomer. Suitable techniques for using a macromolecular organic compound having a hydrophobic cavity are disclosed in, for example, U.S. Pat. No. 5,521,266.

Preferably, the macromolecular organic compound having a hydrophobic cavity is added to the polymerization reaction mixture to provide a molar ratio of macromolecular organic compound to very low water solubility monomer or macromonomer of from 5:1 to 1:5000 and more preferably from 1:1 to 1:500.

Macromolecular organic compounds having a hydrophobic cavity useful in the present invention include for example cyclodextrin or cyclodextrin derivatives; cyclic oligosaccharides having a hydrophobic cavity such as cycloinulohexose, cycloinuloheptose, or cycloinuloctose; calyxarenes; cavitands; or combinations thereof. Preferably, the macromolecular organic compound is β-cyclodextrin, more preferably methyl-β-cyclodextrin.

Monomers having low water solubility include for example primary alkenes; styrene and alkylsubstituted styrene; α-methyl styrene; vinyltoluene; vinyl esters of $C_4$ to $C_{30}$ carboxylic acids, such as vinyl 2-ethylhexanoate, vinyl neodecanoate; vinyl chloride; vinylidene chloride; N-alkyl substituted (meth)acrylamide such as octyl acrylamide and maleic acid amide; vinyl alkyl or aryl ethers with ($C_3$–$C_{30}$) alkyl groups such as stearyl vinyl ether; ($C_1$–$C_{30}$) alkyl esters of (meth)acrylic acid, such as methyl methacrylate, ethyl (meth)acrylate, butyl (meth)acrylate, 2-ethylhexyl (meth)acrylate, benzyl (meth)acrylate, lauryl (meth) acrylate, oleyl (meth)acrylate, palmityl (meth)acrylate, stearyl (meth)acrylate; unsaturated vinyl esters of (meth) acrylic acid such as those derived from fatty acids and fatty alcohols; multifunctional monomers such as pentaerythritol triacrylate; monomers derived from cholesterol or combinations thereof.

In preparation of the comb copolymer of the present invention, an aqueous copolymer composition is provided that is preferably produced by the method previously described herein. The aqueous copolymer composition contains water insoluble particles of graft copolymer that are preferably comb copolymer particles. The comb copolymer particles preferably have a weight average particle size of from 50 nm to 500 nm, and more preferably from 80 nm to 350 nm.

The second ethylenically unsaturated monomer may be any ethylenically unsaturated monomer that provides desirable properties in the copolymer particles, such as those useful in the monomer composition as previously described herein.

Although the backbone of the comb copolymer may be branched, with such branching including, for example, "star" structures, it is preferred that the backbone is linear. Compositionally, the backbone of the copolymer preferably contains polymerized units of the second ethylenically unsaturated monomer derived from the monomer composition.

The weight ratio of the graft segment of the comb copolymer to the backbone of the comb copolymer is preferably 10:90 to 60:40, more preferably 15:85 to 50:50, and most preferably 20:80 to 40:60.

Preferably, the Tg of the backbone is from –80° C. to 0° C., more preferably from –65° C. to –20° C., and most preferably from –65° C. to –40° C.

It is further required that the composition of the backbone of the comb copolymer will be such that the backbone is not miscible in the thermosetting polymer of the invention. The solubility parameters of the backbone and the thermosetting polymer can be estimated and compared to predict immiscibility by methods such as that of Van Krevelen, described herein above.

The pendant graft segments of the comb copolymer preferably contain polymerized units of the macromonomer. In a preferred embodiment of the present invention, each graft segment is derived from one macromonomer. Additionally, the pendant graft segments contain less than 5 weight percent and more preferably less than 1 weight percent of the polymerized second ethylenically unsaturated monomer derived from the monomer composition, based on the total weight of the pendant graft segments.

Preferably, the Tg of the graft segment of the comb copolymer is from 50° C. to 180° C., more preferably from 50° C. to 130° C., and most preferably from 70° C. to 110° C.

It is further preferred that the graft segment is miscible with the thermosetting polymer of the present invention. Although not wishing to be bound be any particular theory, it is thought that this miscibility of the graft segment is desirable because favorable interaction of the graft segment with the thermosetting polymer renders the comb copolymer compatible with the thermosetting polymer. In this way, domains of the backbone, which is necessarily not miscible with the thermosetting polymer, are uniformly distributed throughout the thermoset article that is ultimately formed, and such uniform distribution is directly correlated with enhanced toughness. In this way, the presence of reactive groups on the comb copolymer is not necessary to achieve toughening of the thermoset article produced from the thermosetting blend. However, reactive groups may, optionally, be present on either the backbone or the graft segment. The solubility parameters of the graft segment and the thermosetting polymer can be estimated and compared to predict miscibility by methods such as that of Van Krevelen, described herein above. The domains of rubbery (i.e., elastormeric) backbone, with associated and compatibilizing graft segments, may range in size (i.e., average diameter) from 0.01 micron to 50 microns, preferably from 0.5 micron to 50 microns, more preferably 1.0 micron to 50 microns, and most preferably 1.0 micron to 20 microns. Broad domain size distributions are typically observed, and may extend, for example, from 1.0 to 50 microns. Domain size and, to an extent, domain size distribution can be controlled by controlling the ratio of graft segment to backbone in the comb copolymer. Typically, increasing the relative amount of miscible graft segment leads to a decrease in the size of the domains of backbone polymer. Herein, the calculations related to domain size and distribution use the same mathematical formulae as those related to particle size. Domain sizes can be measured by any of the techniques well known to the art, including optical microscopic, electron microscopic, and atomic force microsopic techniques.

Used herein, the meaning of the term "compatible" is the same as that commonly used in the art. Two polymers that are completely, or partially, immiscible may still be uniformly dispersed in each other. Such uniform distributions are observed when a favorable interaction exists between one polymer (herein, the thermosetting polymer) and a portion of another polymer (herein, the graft segment of the comb copolymer). In addition to more uniform distribution, the adhesion of one phase (i.e., the backbone of the comb copolymer) to the other phase (i.e., the matrix phase which is the thermoset polymer that is formed upon curing of the thermosetting polymer) is enhanced due to an interphase which includes the thermosetting polymer and the graft segment. Such enhanced adhesion is further directly correlated with improved impact.

In a preferred embodiment of the present invention, the water insoluble comb copolymer particles typically contain from 0 weight percent to 10 weight percent, preferably 0.2 weight percent to 10 weight percent, more preferably from 0.5 weight percent to 5 weight percent, and most preferably from 1 weight percent to 2 weight percent of an acid containing macromonomer, based on the total weight of the graft copolymer. The acid containing macromonomer preferably has a composition as previously described herein.

Although in no way intending to be bound by theory, it is believed that the "acid containing macromonomer" is attached to the surface of the water insoluble graft copolymer particles and provides stability. By "attached," as used herein, it is believed that the acid containing macromonomer is bound in some manner (e.g., covalent, hydrogen bonding, ionic) to a polymer chain in the particle. Preferably, the acid containing macromonomer is covalently bound to a polymer chain in the particle. It has been found that the acid containing macromonomer provides stability to the particles such that the aqueous copolymer composition produced exhibits unexpected improved shear stability; freeze thaw stability; and stability to additives in formulations, as well as reduction of coagulum during the polymerization. Although improved stability can be achieved using acid containing monomer, these benefits are most dramatic when an acid containing macromonomer is used.

The comb copolymer of the present invention may be isolated as powder, or other solid particles, from dispersions containing it (e.g., aqueous emulsions) by methods well known in the art. These methods include, for example, spray drying, coagulation and oven drying, freeze drying, and devolatilizing extrusion.

The thermosetting polymer of the present invention may be any thermosetting polymer known to the art. Preferably, the thermosetting polymer is a polymer selected from the group consisting of: acrylate polymer; polyester polymer; polyurethane polymer, epoxy polymer, vinyl ester polymer; unsaturated polyester; phenol-formaldehyde polymer, melamine-formaldehyde polymer, urea-formaldehyde polymer, and combinations thereof. More preferably, the thermosetting polymer is a polymer selected from the group consisting of: epoxy polymer, vinyl ester polymer; unsaturated polyester; and combinations thereof.

In order to produce the thermoset article of the present invention, the comb copolymer and the thermosetting polymer are combined with mixing and, optionally, heating to form the "thermosetting blend" of the present invention. Such blending may be accomplished, for example, by mechanical stirring.

The thermosetting blend is shaped to the shape of the desired toughened article of the present invention. Equipment used to shape the thermosetting blend includes, for example, molds. The thermosetting blend is then cured to form the desired toughened article. It may further be advantageous to convert the toughened article first produced by curing into another article by, for example, sawing, or otherwise cutting, the original article into another article having different dimensions.

Typically, the comb copolymer of the present invention is present in an amount sufficient to increase the "fracture toughness" of the thermoset article, as defined herein above, by at least 15 percent compared to an article formed identically, absent the comb copolymer. Preferably, the amount of comb copolymer will be sufficient to increase the fracture toughness of the article from 15% to 2,000%, more preferably from 50% to 1000%, and most preferably from 50% to 600%, when compared with an article formed identically, absent the comb copolymer.

The amount of comb copolymer contained in the composition of the present invention, which includes the thermosetting blend and the thermoset article, is preferably 1 to 20 PHR, more preferably 5 to 20 PHR, and most preferably 10 to 20 PHR, wherein PHR refers to parts by weight of comb copolymer per hundred parts by weight of thermoset polymer.

The "thermosetting blend" of the present invention may contain, in addition to the thermosetting polymer and the comb copolymer, other additives including, for example, additives used for curing the thermosetting polymer to form the thermoset article. Such additives include monomers that may, for example, be included to fluidize the thermosetting polymer composition and to polymerize with the thermosetting polymer during curing and, optionally, post curing steps. Catalysts, initiators, and combinations thereof may be added to cause, or complete reaction among the various components of the thermosetting blend. Other additives include: fiberglass fiber or cloth; other reinforcing fibers such as carbon fiber; fillers, pigments, thickeners such as clays, added to control rheology; other rheology modifying additives; and polymeric additives for shrinkage control. These additives are well known to those skilled in the art of preparing thermoset articles from thermosetting polymers.

A detailed description of thermosetting polymers, processing and curing methods for thermosetting polymers, additives typically used to cure thermosetting polymers, and additives included in the resulting thermoset articles can be found in the comprehensive reference: Engineered Materials Handbook Vol. 1, Composites, Ed. C. A. Dostal, ASM International Publisher, Metal Park, Ohio, (1987).

Any type of thermoset article common to the art may be made by the method of the present invention. A non-exhaustive list of these articles includes, for example: construction materials, such as molding, pipe, roofing panels, bridge decking, fiberglass reinforced supports and beams; sheet goods; appliance housings such as housings for computers; other appliance components, refrigerators, and air conditioners; both interior and exterior automotive parts, including body parts (e.g., fenders); packaging materials; toys; and plastic parts.

Experimental

Molecular Weight Determination Using Gel Permeation Chromatography (GPC)

Gel Permeation Chromatography, otherwise known as size exclusion chromatography (SEC), actually separates the members of a distribution of polymer chains according to their hydrodynamic size in solution rather than their molar mass. The system is then calibrated with standards of known molecular weight and composition to correlate elution time with molecular weight. The techniques of GPC are discussed in detail in *Modern Size Exclusion Chromatography*, W. W. Yau, J. J Kirkland, D. D. Bly; Wiley-Interscience, 1979, and in *A Guide to Materials Characterization and Chemical Analysis*, J. P. Sibilia; VCH, 1988, p.81–84.

For example, the molecular weight information for a low molecular weight sample (e.g., 10,000) may be determined as follows: The sample (an aqueous emulsion containing low molecular weight particles) is dissolved in THF at a concentration of approximately 0.1% weight sample per volume THF, and shaken for 6 hours, followed by filtration through a 0.45 μm PTFE (polytetrafluoroethylene) membrane filter. The analysis is performed by injecting 100 μl of the above solution onto 3 columns, connected in sequence and held at 40° C. The three columns are: one each of PL Gel 5 100, PL Gel 5 1,000, and PL Gel 5 10,000, all available from Polymer Labs, Amherst, Mass. The mobile phase used is THF flowing at 1 ml/min. Detection is via differential refractive index. The system was calibrated with narrow polystyrene standards. PMMA-equivalent molecular weights for the sample are calculated via Mark-Houwink correction using $K=14.1\times10^{-3}$ ml/g and $a=0.70$ for the polystyrene standards and $K=10.4\times10^{-3}$ ml/g and $a=0.697$ for the sample.

SYNTHESIS EXAMPLES

Some embodiments of the invention will now be described in detail in the following Examples. The following abbreviations shown in Table 1 are used in the examples

TABLE 1

| Abbreviation | Abbreviations |
|---|---|
| A-16-22 | Polystep A-16-22, anionic surfactant, supplied as 22% solids by Stepan Company, located in Northfield, Illinois. |
| OT-75 | Aerosol ™ OT-75 sodium dioctyl sulfosuccinates, Cytec Industries B.V., Botlek-Rotterdam, The Netherlands. |
| BA | Butyl acrylate |
| EA | Ethyl acrylate |
| MMA | Methyl methacrylate |
| BMA | Butyl methacrylate |
| MAA | Methacrylic acid |
| CoBF | Co(II)-(2,3-dioxyiminobutane-BF$_2$)$_2$ |
| CVA | 4,4-azobis(4-cyanovaleric acid) |
| Fe | 0.15% Ferrous sulfate in water |

TABLE 1-continued

| Abbreviation | Abbreviations |
|---|---|
| DBS | Dodecyl benzene sulfonate |
| GC | Gas chromatograph |
| SEC | Size exclusion chromatography |
| HPLC | High performance liquid chromatography |
| Init. | Initiator |
| IR | Infrared spectroscopy |
| LCCC | Liquid chromatography under critical conditions |
| NaPS | Sodium persulfate |
| Na$_2$CO$_3$ | Sodium bicarbonate |
| Mn | Number average molecular weight |
| MM | Macromonomer |
| PMAA-MM | Poly-methacrylic acid macromonomer |
| MM | Macromonomer |
| PMMA-MM | Poly-methyl methacrylate macromonomer |
| Poly-(BA-g-BMA) | Graft copolymer of BA with BMA side chains |
| Poly-(BA-g-MMA) | Graft copolymer of BA with MMA side chains |
| Wako VA-044 | 2,2'-azobis[2-(2-imidazolin2-2yl)propane] dihydrochloride |

In the Examples, monomer conversion was determined by GC analysis of unreacted monomer using standard methods. Weight percent solids for the macromonomer and copolymer compositions were determined by gravimetric analysis. Particle sizes for the macromonomer and copolymer compositions were obtained using a Matec CHDF 2000 particle size analyzer equipped with a HPLC type Ultra-violet detector.

Macromonomer was measured for number average molecular weight by SEC using a polystyrene standards from Polymer Laboratories (PS-1) having a peak average molecular weight ranging from 580 to 7,500,000 with narrow molecular weight distribution. Conversions from polystyrene to PMMA were made using Mark-Houwink constants. Copolymer compositions were evaluated for number average molecular weight and weight average molecular weight using SEC as described above.

EXAMPLES 1.1 TO 1.8

Preparation of Macromonomers by Emulsion Polymerization

Macromonomer (MM) was prepared by emulsion polymerization processes in Examples 1.1 to 1.8. The polymerization was conducted in a 5-liter, four neck round bottom reaction flask equipped with a mechanical stirrer, temperature control device, condenser, monomer feed line and a nitrogen inlet except for example 1.1 which was prepared in a 5 gallon reactor with similar attachments. The specific amounts of water, surfactant, monomers, chain transfer agent (CTA), and initiator used in Examples 1.1 to 1.8 are shown in Table 2. These ingredients were added according to the following procedure. In a different flask from the reaction flask, a monomer solution was prepared by dissolving the chain transfer agent in the monomer mixture consisting of all the monomers listed in Table 2 under a nitrogen purge. Deionized water and surfactant were introduced into the reaction flask at room temperature to form a water surfactant solution. The water surfactant solution was mixed and heated to 80° C. with stirring under a nitrogen purge. Upon reaching a temperature of 80° C., and upon complete dissolution of the surfactant, the initiator (CVA) was added to the water surfactant solution with stirring for 2 minute to permit the initiator to dissolve. After dissolution of the initiator, MMA (245 g for example 1.1 and 63 g for examples 1.2 to 1.8, respectively) was introduced into the reaction flask and allowed to react for 10 minutes. At the end of 10 minutes, 20 percent by weight of the monomer solution was added to the reaction flask with stirring. Following this initial charge, the remaining monomer solution was fed over a period of 2 hours, with stirring, to form a reaction mixture. At the end of the feed period, the reaction mixture was maintained at 80° C. for an additional 2 hours. The reaction mixture was then cooled to room temperature and passed through a filter cloth to remove any coagulum.

Generally, the resulting macromonomer emulsion contained less than 5 weight percent coagulum based on the total weight of macromonomer, and the conversion of monomer was over 99 weight percent, based on the total weight of monomer added. The Mn, weight percent solids and particle size for each macromonomer are reported in Table 2.

EXAMPLE 3

Preparation of Acrylic Graft Copolymers by Semi-continuous Process

In Examples 3.1 to 3.8, graft copolymers were prepared by a semi-continuous emulsion polymerization process in a 5-liter round bottom flask with four neck equipped with a mechanical stirrer, temperature control device, initiator feed lines and a nitrogen inlet. The specific amounts of Macromonomer (MM, as emulsion), water, surfactant, monomers, acid containing monomers, and initiator used in Examples 3.1 to 3.9 are shown in Table 3. These ingredients were added according to the following procedure. A monomer emulsion of deionized water ($H_2O$ #2 in Table 3), surfactant, and monomers (as listed in Table 3) was prepared in a separate flask. Deionized water ($H_2O$ #1 in Table 3),

TABLE 2

Preparation of Macromonomers (MM)

| Example No. | $H_2O$ (g) | Surf. (g)[3] | MMA (g) | BMA | EA | Other | CTA grams[1] | Init. (g)[2] | Part. Size (nm) | Mn | Wt % Solids |
|---|---|---|---|---|---|---|---|---|---|---|---|
| 1.1 | 2380 | 55 | 1018 | — | 179.6 | — | 0.084 | 12.6 | 90 | 21287 | 33.8 |
| 1.2 | 2300 | 51 | 891.6 | 223 | — | — | 0.1 | 11.8 | 96 | 11738 | 31.2 |
| 1.3 | 2380 | 16[4] | 1018 | — | 179.6 | — | 0.16 | 12.6 | 99 | 6717 | 34.1 |
| 1.4 | 13232 | 306 | 6655 | — | — | — | 0.42 | 70 | 83 | 3937 | 34.1 |
| 1.5[9] | 2300 | 51 | 950 | — | — | 50[5] | 0.1 | 12 | 90 | 10000 | 34 |
| 1.6[9] | 2300 | 51 | 950 | — | — | 50[6] | 0.1 | 12 | 90 | 10000 | 34 |
| 1.7[9] | 2300 | 51 | 950 | — | — | 50[7] | 0.1 | 12 | 90 | 10000 | 34 |
| 1.8[9] | 2300 | 51 | — | — | — | 1000[8] | 0.1 | 12 | 90 | 10000 | 34 |

[1]Chain transfer agent (CoBF)
[2]CVA, supplied by Aldrich as a 75 weight percent aqueous solution of initiator.
[3]A-16-22 except for [4]
[4]OT-75
[5]Methacrylic acid
[6]Hydroxyethyl methacrylate
[7]Glycidyl methacrylate
[8]Cyclohexylmethacrylate
[9]The values listed from Examples 1.5–1.8 are the values one would use in preparation of the corresponding macromonomers.

EXAMPLE 2

Preparation of PMAA-MM by Solution Polymerization

MAA macromonomer (PMAA-MM) was prepared by aqueous solution polymerization in a 2-liter baffled flange flask equipped with a mechanical stirrer, condenser, temperature control device, initiator feed lines and a nitrogen inlet. The apparatus was purged with nitrogen for 30 minutes after 0.018 g of CoBF was added. Deionized water, 1080 g, was charged to the flask and heated to 55° C. under a nitrogen purge. A monomer mixture containing 510 ml of MAA and 0.01 g of CoBF was prepared separately under nitrogen. When the deionized water reached a temperature of 55° C., 1.94 g of initiator (Wako VA-044) was added to the reaction flask. Following the addition of the initiator, the monomer mixture was added over a period of 60 minutes to the reaction flask with stirring. The temperature was then held at 55° C. for 2 hours following completion of the monomer mixture feed. Upon cooling the reaction flask to room temperature, the MAA-MM (Example 2.1) was isolated as dried polymer by rotary evaporation. The number average molecular weight (Mn) of the MAA-MM was determined by proton nuclear magnetic resonance to be 4030 based on the integration of the vinyl end group with respect to the methyl and methylene groups of the polymer chain.

MM from the example indicated in Table 1 and 20% of the monomer emulsion were introduced into the reaction flask at room temperature to form a reaction mixture. The reaction mixture was heated to 85° C. while stirring under a nitrogen purge. Upon reaching 85° C., the initiator and buffer solutions were introduced into the reaction flask. The remaining monomer emulsion was added over a period of 30 minutes with the temperature maintained at 90° C. Upon completion of the feeds, the reaction mixture was maintained at the reaction temperature for a period of 1 hours. The resulting copolymer composition was analyzed for conversion and other properties as described in Example 5. The conversion of BA, determined by standard GC methods, was greater than 99 weight percent based on the total weight of BA charged.

TABLE 3

Preparation of Acrylic Graft Copolymers by Semi-Continuous Process

| Example | Ex | MM[1] Amt. (g) | H₂O #1 (g) | H₂O #2 (g) | Surf.[2] (g) | BA (g) | EHA (g) | Temp. (° C.) | Init.[4] (g) | Buffer[5] (g) | Add. (g) |
|---|---|---|---|---|---|---|---|---|---|---|---|
| 3.1 | 1.1 | 1817 | 400 | 203 | 29.7 | 1141 | — | 90 | 1.22 | — | 0.35[7] |
| 3.2 | 1.2 | 1469 | — | 310 | 15.4 | 456.6 | — | 90 | 0.63 | — | — |
| 3.3 | 1.3 | 1500 | 454 | 334 | 9.8[8] | — | 941 | 90 | 1.01 | — | 0.29[7] |
| 3.4 | 1.4 | 1801 | 400 | 203 | 29.7 | 1115 | — | 90 | 1.22 | 1.22 | 26.5[6] |
| 3.5[9] | 1.5 | 1500 | 400 | 200 | 30 | 947 | — | 90 | 1.2 | — | — |
| 3.6[9] | 1.6 | 1500 | 400 | 200 | 30 | 947 | — | 90 | 1.2 | — | — |
| 3.7[9] | 1.7 | 1500 | 400 | 200 | 30 | 947 | — | 90 | 1.2 | — | — |
| 3.8[9] | 1.8 | 1500 | 400 | 200 | 30 | 947 | — | 90 | 1.2 | — | — |

[1] Macromonomer emulsion prepared by method of Example 1.
[2] Ethoxylated $C_6$ to $C_{18}$ alkyl ether sulfate having from 1 to 40 ethylene oxide groups per molecule (30% active in water). Except for example 3.1.
[4] NaPS dissolved in 10 g of water.
[5] Sodium carbonate dissolved in 15 g of water.
[6] PMAA-MM (prepared by method of Example 2.1)
[7] Dodecylmercaptan
[8] OT-75
[9] The values listed from Examples 3.5–3.9 are the values one would use in preparation of the corresponding acrylic graft copolymers (i.e., comb copolymer).

Characterization of Example 3 Copolymer Compositions

Graft copolymer compositions prepared in the previous examples were characterized by various analytical techniques to determine wt % solids, particle size, weight average molecular weight, number average molecular weight, and percent incorporation of macromonomer.

Determination of the amount of unreacted macromonomer was carried out by HPLC analysis using the following procedure. The copolymer compositions were dissolved in THF and analyzed by gradient elution on an LC-18 column supplied by Supelco, located in Bellefonte, Pa. such that a well-isolated peak was observed for the unreacted macromonomer. Quantification was carried out by calibrating the detector response using known standards of the same macromonomer employed in the synthesis. The results of the characterization are reported in Table 4 below.

TABLE 4

Characterization Of Copolymer Compositions

| Example | % Solids | Particle Size (nm) | Mw (× 10⁻³) | Mn (× 10⁻³) | PMMA-MM Incorp.[1] (wt %) |
|---|---|---|---|---|---|
| 3.1 | 39.6 | 112 | 1541 | 206 | 92 |
| 3.2 | 41.3 | 107 | 1072 | 234 | 93 |
| 3.3 | 43.6 | 130 | 240 | 44 | 83 |
| 3.4 | 44.1 | 114 | 1082 | 107 | |
| 3.5 | 40 | 100 | | | |
| 3.6 | 40 | 100 | | | |
| 3.7 | 40 | 100 | | | |
| 3.8 | 40 | 100 | | | |

[1]Based on the total weight of macromonomer added to reaction vessel.

All samples were isolated to form dry polymer by freezing the aqueous emulsions to induce coagulation followed by drying at 40° C. in a vacuum oven until the moisture content was less than 0.5%, based on polymer.

Comparative Example A

Formation of Article (Test Specimen) from Neat Aropol 7334-T15.

A resin mixture comprising of AROPOL™ 7334-T15 (from Ashland Chemical, unsaturated isophthalic acid based polyester resin dissolved in styrene monomer), 1.70% of a peroxide catalyst, Lupersol™ DDM 9 (methyl ethyl ketone peroxide (MEK)) (Akzo Nobel), 0.4% of a reducing agent, cobalt naphthenate (6% Co and 53% mineral spirits) (Alfa Aesar) and 0.2% diethylaniline was prepared by the following procedure: Eight hundred (800) grams of AROPOL™ 7334-T15 were charged to a resin kettle and sparged for 15 minutes with dry nitrogen. At the end of the 15 minutes period, the resin was placed under vacuum (635 mm Hg) and degassed for fifteen minutes. Cobalt naphthenate (3.2 g) and 1.6 g of diethylaniline was then added to the resin followed by vigorous mixing to yield a uniform mixture. This was followed by addition of 13.6 g of Lupersol™ DDM 9 initiator. After addition of the initiator, the entire mixture was degassed for 15 minutes to remove any entrained gas bubbles that resulted from the mixing process. Next, a closed aluminum metal mold was evacuated down to a pressure of 635 mm Hg. The degassed mixture was injected into the mold with the aid of a 0.34 MPa of back pressure. The resin was subsequently cured at room temperature for a minimum of 12 hours and post cured at 125° C. for 1 hour in a forced air oven. After curing, the solid panel, 0.3175 cm in thichness was removed from the molds and test pieces are cut for evaluation in accordance with ASTM method E-399.

EXAMPLE 4

Formation of Toughened Thermoset Article from Aropol™ 7334-T15 and Comb Copolymer (Example 3.2)

7.5 parts by weight of Example 3.2 comb copolymer (50% BA/50% (70 MMA/20 BMA macromonomer)) was dispersed into 100 parts by weight of Aropol™ 7334-T15 resin by stirring for 30 minutes with an overhead stirrer attached to a propeller type stirring shaft. Eight hundred (800) grams of this blend were mixed with 1.70% of a peroxide catalyst, Lupersol™ DDM 9, 0.4% of a reducing agent, cobalt naphthenate (6% Co and 53% mineral spirits) (Alfa Aesar) and 0.2% diethylaniline and samples were prepared according to the method described for preparation of the specimens in Comparative Example A Fracture Toughness determination for Example 4 and Comparative Example A.

Example 4 specimens and Comparative Example A specimens were tested for fracture toughness and fracture energy according to Fracture Test—Compact Tension ASTM method E-399. The results are shown in Table 5 below.

TABLE 5

Room temperature fracture toughness with and without comb copolymer.

| Example | Example Type | Fracture Toughness $K_{1c}$ $(MPa)m^{1/2}$ | Fracture Energy $G_{1c}$ $J/m^2$ |
|---|---|---|---|
| Comparative A | Neat Aropol ™ 7334 | 0.88 | 112 |
| 4 | 100 parts Aropol ™ 7334 thermosetting formulation and 7.5 parts Example 3.2 comb copolymer | 1.22 | 216 |

Table 5 reveals that fracture toughness and fracture energy of the thermoset article (here specimens produced and tested according to ASTM method E-399) are enhanced by the inclusion of the comb copolymer of the present invention. The number of specimens tested for each Example was ten (10).

A similar approach should give toughness improvement (i.e., at least 15%) compared to specimens absent the comb copolymer of the present invention on other classes of thermosetting polymers, for example: acrylates; polyesters; polyurethanes, epoxies, vinyl esters; unsaturated polyesters; phenol-formaldehyde, melamine formaldehyde, and urea formaldehyde based polymers, and combinations thereof.

What is claimed is:

1. A method comprising the steps of:
   (a) forming a thermosetting blend comprising a thermosetting polymer and a comb copolymer;
   (b) shaping said thermosetting blend; and
   (c) curing said thermosetting blend to form an article;
   wherein said comb copolymer comprises a backbone and at least one graft segment;
   wherein said forming comprises mixing and, optionally, heating;
   wherein said article has a fracture toughness at least 15 percent greater than that of a second article formed identically, absent the comb copolymer; and
   wherein said comb copolymer is produced by a polymerization method comprising the steps of:
   (a) forming a macromonomer aqueous emulsion comprising a plurality of water-insoluble particles of macromonomer, wherein said macromonomer is a macromonomer produced by aqueous emulsion polymerization and comprises polymerized units of at least one first ethylenically unsaturated monomer, and macromonomer further having:
      (i) a degree of polymerization of from 10 to 1000; and
      (ii) at least one terminal ethylenically unsaturated group;
   (b) forming a monomer composition comprising at least one second ethylenically unsaturated monomer; and
   (c) combing at least a portion of said macromonomer aqueous emulsion and at least a portion of said monomer composition to form a polymerization reaction mixture; and
   (d) polymerizing said macromonomer with said second ethylenically unsaturated monomer in the presence of an initiator to produce said plurality of comb copolymer particles.

2. The method of claim 1, wherein said thermosetting polymer is a polymer selected from the group consisting of: acrylate polymer; polyester polymer; polyurethane polymer, epoxy polymer, vinyl ester polymer; unsaturated polyester; phenol-formaldehyde polymer, melamine-formaldehyde polymer, urea-formaldehyde polymer, and combinations thereof.

3. The method of claim 1, wherein said thermosetting polymer is a polymer selected from the group consisting of: epoxy polymer, vinyl ester polymer; unsaturated polyester; and combinations thereof.

4. The method of claim 1, wherein said backbone is immiscible with said thermosetting polymer.

5. The method of claim 1, wherein said graft segment is miscible with said thermosetting polymer.

6. The method of claim 1, wherein said graft segment has a degree of polymerization of 10 to 1,000.

7. The method of claim 1, wherein said backbone has a glass transition temperature of −80° C. to 0° C.

8. The method of claim 1, wherein said graft segment of said comb copolymer has a glass transition temperature of 50° C. to 180° C.

9. The method of claim 1, wherein said graft segment and said backbone are in a weight ratio of 10:90 to 60:40.

10. The method of claim 1, wherein said comb copolymer has a weight average molecular weight of 75,000 to 2,000,000.

11. The method of claim 1, wherein said comb copolymer is present at 1 to 20 parts by weight per 100 parts by weight of said thermosetting polymer.

12. An article comprising a thermoset polymer and a comb copolymer, wherein said article has a fracture toughness at least 15 percent greater than that of a second article formed identically, absent said comb copolymer; and
   wherein said comb copolymer is produced by a polymerization method comprising the steps of:
   (a) forming a macromonomer aqueous emulsion comprising a plurality of water-insoluble particles of macromonomer, wherein said macromonomer is a macromonomer produced by aqueous emulsion polymerization and comprises polymerized units of at least one first ethylenically unsaturated monomer, said macromonomer further having:
      (i) a degree of polymerization of from 10 to 1000; and
      (ii) at least one terminal ethylenically unsaturated group;
   (b) forming a monomer composition comprising at least one second ethylenically unsaturated monomer; and
   (c) combining at least a portion of said macromonomer aqueous emulsion and at least a portion of said monomer composition to form a polymerization reaction mixture; and
   (d) polymerizing said macromonomer with said second ethylenically unsaturated monomer in the presence of an initiator to produce said plurality of comb copolymer particles.

13. An article produced by the method of claim 1.

14. The method of claim 1 wherein the step of forming the macromonomer aqueous emulsion comprises polymerizing in an aqueous emulsion the at least first ethylenically unsaturated monomer in the presence of a transition metal chelate chain transfer agent and a free radical initiator to form the macromonomer particles.

15. The method of claim 1 wherein the first ethylenically unsaturated monomer is polymerized in the presence of a macromolecular organic compound having a hydrophobic cavity.

16. The article of claim 12 wherein the step of forming the macromonomer aqueous emulsion comprises polymerizing in an aqueous emulsion the at least first ethylenically unsaturated monomer in the presence of a transition metal chelate chain transfer agent and a free radical initiator to form the macromonomer particles.

17. The article of claim 12 wherein the first ethylenically unsaturated monomer is polymerized in the presence of a macromolecular organic compound having a hydrophobic cavity.

* * * * *